United States Patent Office 2,846,600
Patented Aug. 5, 1958

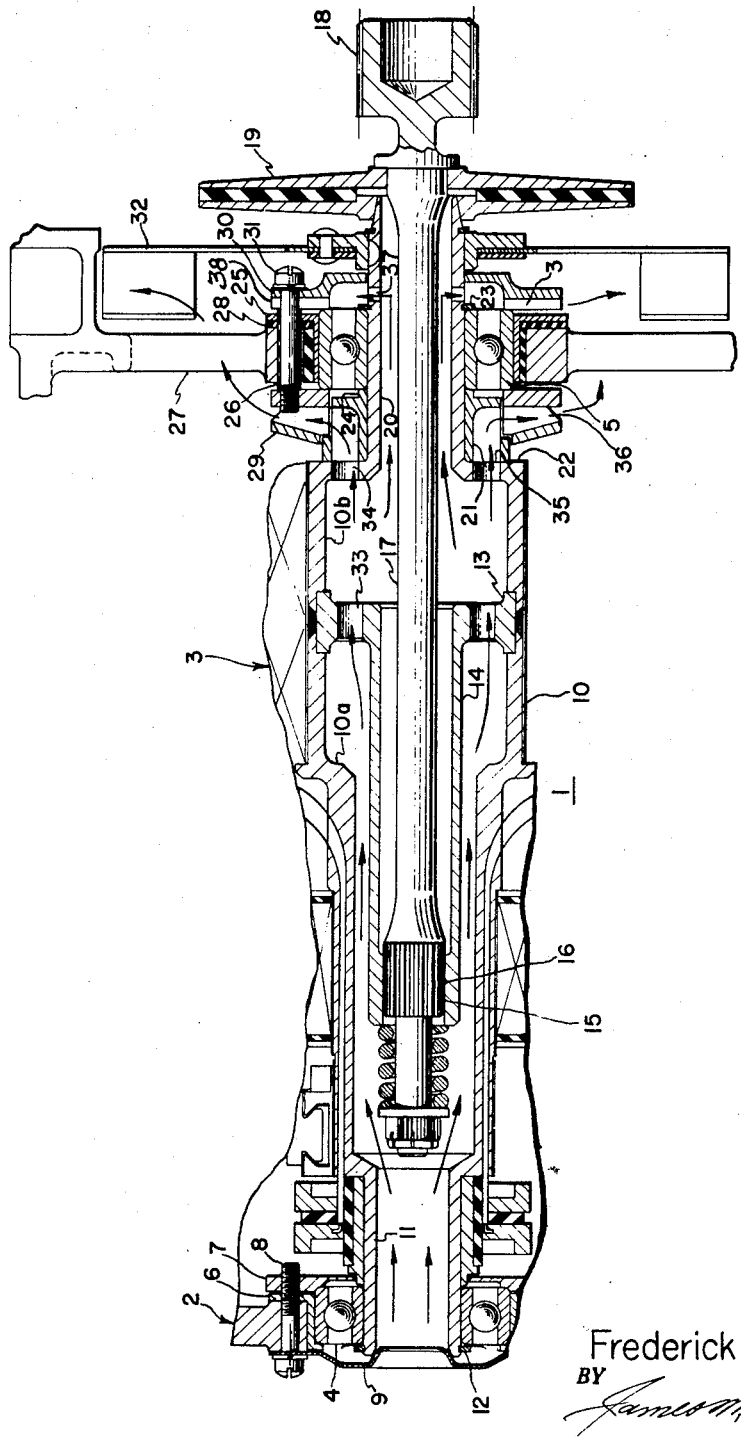

2,846,600

DYNAMOELECTRIC MACHINE

Frederick M. Potter, Westwood, N. J., assignor to Bendix Aviation Corporation, Eatontown, N. J., a corporation of Delaware Application February 14, 1956, Serial No. 565,401

5 Claims. (Cl. 310—61)

The present invention relates to dynamoelectric machines and more particularly to a shaft and bearing arrangement adapted for use in dynamoelectric machines.

One of the major sources of generator failure, especially for those used in aircraft, has been in the failure of the bearing on the drive end. Heretofore, the cooling air had passed over the windings of the machine and had very little, if any, cooling effect. Further, due to the construction it was difficult to direct cooling air on the bearing. Various methods were attempted wherein the cooling air was directed to one side of the bearing. This resulted in the lubrication being blown out of the bearing due to the uneven pressure thereon.

Another source of failure in generators has been in the quill shaft. Due to the configuration of the generator, the conventional quill shaft was not of sufficient length to previde the desired flexibility. This causes undue torsional strain which results in failure of the shaft.

The present invention provides a novel drive end bearing arrangement in which the bearing is cooled by air from the antidrive end of the generator, flowing through the hollow generator shaft. Heat exchanger plates conduct away the heat generated in the bearing and dissipate it into the cooling air. Further, a novel arrangement of the flexible drive shaft permits a longer shaft than in conventional structure and at the same time provides adequate size passages for the cooling air.

It is an object of the invention to provide an improved dynamoelectric machine.

Another object of the invention is to provide novel cooling means for a dynamoelectric machine.

Another object of the invention is to provide improved mounting means for a bearing.

Another object of the invention is to provide a novel shaft arrangement for a dynamoelectric machine.

Another object of the invention is to provide novel cooling means for bearings.

The above and other objects and features of the invention will appear more fully hereinafter from a consideration of the following description taken in connection with the accompanying drawing, wherein one embodiment is illustrated by way of example.

In the drawing:

The single figure is a partial sectional view of a dynamoelectric machine illustrating one embodiment of the invention.

Referring now to the drawing, wherein a dynamoelectric machine is indicated by the numeral 1, only a portion of the dynamoelectric machine 1 has been illustrated, the remainder has been omitted for simplicity. The dynamoelectric machine 1 has a housing 2 in which an armature 3 is rotatably supported therein by bearings 4 and 5. The bearing 4 is secured in the housing 2 by a bearing liner 6, clamping member 7 and screws 8. An air scoop 9 may be secured to the housing 2 by the screws 8.

The armature 3 includes a hollow shaft 10 having a restricted portion 11 adapted for a press fit in the bearing 4. A snap ring 12 secures the shaft 10 in the bearing 4. The shaft 10 is made up from sections 10a and 10b welded together with a flange 13 of an inner shaft 14 to form a unitary structure. The inner shaft 14 is arranged concentric with the shaft 10 and extends axially towards the restricted portion 11. The shaft 14 has an internal splined section 15 adapted to mate with an external splined section 16 on one end of a quill shaft 17. The other end of the quill shaft 17 terminates in a drive spline 18 adapted to mate with a driving spline of an engine (not shown). The quill shaft 17 is connected at the drive end to the shaft 10 by a torsional vibration damper 19.

The section 10b of the shaft 10 has a restricted section 20 adapted to receive the bearing 5. Also, a heat exchanger plate 21 is carried on the section 20 between the bearing 5 and a shoulder 22 of the shaft 10. A snap ring 23 together with the plate 21 and shoulder 22 secure the bearing 5 in position on the shaft 10. The heat exchanger plate 21 has a circumferential flange 24 adapted for intimate contact with the inner race of the bearing 5.

The outer race of the bearing 5 is fitted in a flanged ring member 25 which in turn is adapted to fit into a bore 26 of a stationary housing support 27. An insulating member 28 is fitted between the ring member 25 and the housing support 27. The ring member 25 and the housing support 27 have a narrower axial dimension than the outer race of the bearing 5.

The outer race of the bearing 5 is clamped by heat exchanger plates 29 and 30 by means of a plurality of bolts 31. A fan 32 is secured to the shaft 10 between the vibration dampener 19 and heat exchanger plate 30 in a conventional manner.

Cooling fluid, indicated by arrows, enters the hollow shaft 10 at the antidrive end through the air scoop 9 and passes around the inner shaft 14 through openings 33 in the range 13. The shoulder 22 of the shaft 10 has openings 34 spaced circumferentially and communicating with passageways 35 in the heat exchanger plate 21. The passageways 35 in the plate 21 open into passageways 36 in the heat exchanger plate 29. A portion of the coolant flows around the quill shaft 17 and through openings 37 around the circumference of the restricted portion 20 of the shaft 10. The openings 37 communicate with openings 38 in the heat exchanger plate 30.

In operation, coolant flows through the hollow shaft 10 and out through the heat exchanger plates 21, 29 and 30. The heat exchanger plates are in intimate contact with the bearing 5, thus conducting heat away therefrom which is dissipated by the flow of coolant through the heat exchanger plates. By subjecting both sides of the bearing to the flow of coolant, the pressure thereon is equalized and the grease is not blown out. Further, by the aforenoted arrangement of clamping the bearing, normal axial movement of the generator shaft is accommodated at the drive end of the bearing. The bearing slides axially in its retainer ring, and the clamping bolts slide axially in the housing, yet restrain the outer race of the bearing from rotation. The insulation member 28 acts as a heat barrier to prevent heat being conducted down the support 27 into the bearing.

Although only one embodiment of the invention has been illustrated and described, various changes in the form and relative arrangement of the parts, which will appear to those skilled in the art, may be made without departing from the scope of the invention.

What is claimed is:

1. In a dynamoelectric machine having a housing, the combination comprising a rotor having a hollow shaft, bearing means for mounting said rotor in said housing, cooling fins positioned in intimate contact with said bearing means, and means including openings in said shaft on each side of said bearing in communication with said cooling fins for directing a flow of coolant through said shaft and over said cooling fins.

2. A dynamoelectric machine having a housing, and a rotor member, said rotor member having a hollow shaft open at one end, bearings adjacent opposite ends of the machine for supporting said shaft for rotation, means for directing cooling air into the open end of said hollow shaft, means including heat exchanger plates for maintaining the bearing at the other end in said housing, and means including openings in said shaft on both sides of and adjacent to said last named bearing to direct the cooling air over said heat exchanger plates.

3. The combination as described in claim 2 and including means for insulating said last named bearing from said housing.

4. A dynamoelectric machine comprising a housing, a stator member and a rotor member, said rotor member having a hollow shaft, an inner hollow shaft concentric with said first hollow shaft and secured thereto, a pencil shaft drivably connected in said inner shaft and extending out of said first shaft, vibration dampener means connecting said pencil shaft and said first shaft, and means for directing a flow of coolant through said first shaft.

5. In a dynamoelectric machine having a housing and a rotor member mounted therein, a shaft and bearing assembly comprising a hollow outer shaft, an inner hollow shaft connected to and concentric with said outer shaft and extending longitudinally therein toward one end thereof, a pencil shaft concentric with said inner shaft and extending therefrom through said outer shaft, a vibration dampener connecting said pencil shaft and said outer shaft at the other end of said outer shaft, bearing means for rotatably supporting said outer shaft adjacent to said other end in said housing, clamping means including heat exchanger fins for securing said bearing means in said housing, and means including openings in said outer housing on both sides of said bearing means to direct a flow of coolant over said heat exchanger fins.

References Cited in the file of this patent

UNITED STATES PATENTS

| | | |
|---|---|---|
| 1,152,680 | Wieselgreen | Sept. 7, 1915 |
| 2,281,971 | Goddard | May 5, 1942 |
| 2,437,954 | Havill | Mar. 6, 1948 |
| 2,590,855 | Gaylord | Apr. 1, 1952 |

FOREIGN PATENTS

| | | |
|---|---|---|
| 687,000 | Germany | Jan. 20, 1940 |